United States Patent
Niijima et al.

(10) Patent No.: US 12,061,740 B2
(45) Date of Patent: Aug. 13, 2024

(54) TACTILE STIMULUS PRESENTATION APPARATUS AND METHOD

(71) Applicant: Nippon Telegraph and Telephone Corporation, Tokyo (JP)

(72) Inventors: Arinobu Niijima, Musashino (JP); Toki Takeda, Musashino (JP); Motohiro Makiguchi, Musashino (JP); Takafumi Mukouchi, Musashino (JP); Takashi Sato, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/795,808

(22) PCT Filed: Feb. 10, 2020

(86) PCT No.: PCT/JP2020/005031
§ 371 (c)(1),
(2) Date: Jul. 27, 2022

(87) PCT Pub. No.: WO2021/161358
PCT Pub. Date: Aug. 19, 2021

(65) Prior Publication Data
US 2023/0088450 A1   Mar. 23, 2023

(51) Int. Cl.
*G06F 3/01*  (2006.01)
(52) U.S. Cl.
CPC .............. *G06F 3/016* (2013.01); *G06F 3/014* (2013.01)

(58) Field of Classification Search
CPC ...................................................... G06F 3/016
See application file for complete search history.

(56) References Cited

U.S. PATENT DOCUMENTS

| | | | |
|---|---|---|---|
| 2004/0037016 A1* | 2/2004 | Kaneko et al. .......... | H02H 3/00 |
| 2005/0132290 A1* | 6/2005 | Buchner et al. ......... | H04B 3/36 |
| 2019/0043322 A1* | 2/2019 | Tachi et al. .............. | G08B 6/00 |
| 2019/0296207 A1* | 9/2019 | Kawana et al. ........ | H01L 35/32 |

FOREIGN PATENT DOCUMENTS

| | | |
|---|---|---|
| JP | 2004085304 | 3/2004 |
| WO | WO 2017099241 | 6/2017 |

OTHER PUBLICATIONS

Stevens et al., "Spatial Acuity of the Body Surface over the Life Span," Somatosensory & Motor Research, 1996, 13(2):153-166.
Stevens et al., "Temperature sensitivity of the body surface over the life span," Somatosensory & Motor Research, 1998, 15(1):12-28.

* cited by examiner

*Primary Examiner* — James J Debrow
(74) *Attorney, Agent, or Firm* — Fish & Richardson P.C.

(57) ABSTRACT

A tactile stimulation presentation device 1 includes a measurement unit 11 configured to measure a first physical quantity with respect to a tactile sensation applied to a first region of a human body, a control unit 12 configured to convert the first physical quantity into a second physical quantity of a different type from the first physical quantity, and a presentation unit 13 configured to apply the second physical quantity to a second region different from the first region.

4 Claims, 4 Drawing Sheets

TACTILE STIMULUS PRESENTATION APPARATUS AND METHOD

CROSS-REFERENCE TO RELATED APPLICATIONS

This application is a National Stage application under 35 U.S.C. § 371 of International Application No. PCT/JP2020/005031, having an International Filing Date of Feb. 10, 2020. The disclosure of the prior application is considered part of the disclosure of this application, and is incorporated by reference in its entirety into this application.

TECHNICAL FIELD

The present invention relates to a tactile stimulation presentation device and a tactile simulation presentation method.

BACKGROUND ART

When tactile stimulation is presented, for example, a method of putting a tactile pin on a fingertip or a palm is used.

CITATION LIST

Non Patent Literature

[NPL 1] JOSEPH C. STEVENS and one other, "Temperature sensitivity of the body surface over the life span", Somatosensory & Motor Research, 1998, 15(1), p. 13-p. 28

[NPL 2] JOSEPH C. STEVENS and one other, "Spatial Acuity of the Body Surface over the Life Span", Somatosensory and Motor Research, Vol. 13, No. 2, 1996, p. 153-p. 166

SUMMARY OF THE INVENTION

Technical Problem

However, there is a problem that tactile stimulation cannot be correctly presented according to positions (e.g., a finger, a thenar eminence, and the like) on which a tactile pin is put because receptors that perceive tactile stimulation are distributed in the whole body of a user but sensitivities thereof greatly differ depending on regions.

For example, a fingertip has a high skin mechanoreceptive unit distribution density and thus a two-point threshold (a minimum distance between two points which can sense tactile simulation as two points) is small and sensitive, but sensitivities of a warm sensation and a cold sensation for sensing a temperature are low. On the other hand, a palm is less sensitive and has a larger two-point threshold than a fingertip, but temperature stimulation sensitivity thereof is higher than that of a fingertip (NPL 1 and 2).

Accordingly, it is conceived that, when a person touches an object, the tactile sensation of the object cannot be finely perceived depending on a touched region. For example, when two kinds of objects having a temperature difference of less than 0.5° C. therebetween are touched by a fingertip, both are felt as the same temperature. Further, when an object in which a distance between two points is less than 1 mm is touched by a palm, the two points are felt as one point. Due to such a sensitivity difference, when the sensation of a fingertip is transmitted to a palm, for example, it is conceived that the sensation cannot be successfully transmitted due to a sensitivity difference therebetween even if tactile stimulations with the same physical quantity are presented. For example, when the number of tactile stimulations is transmitted through a pressure, the fingertip feels the pressure as a plurality of points whereas the palm feels it as a single point.

The present invention has been made in view of the aforementioned circumstances, and an object of the present invention is to provide a technology capable of improving perception sensitivity of tactile information when tactile stimulation is transmitted to a region separate from a region in contact with an object.

Means for Solving the Problem

A tactile stimulation presentation device of one aspect of the present invention includes a measurement unit configured to measure a first physical quantity with respect to a tactile sensation applied to a first region of a human body, a control unit configured to convert the first physical quantity into a second physical quantity of a different type from the first physical quantity, and a presentation unit configured to apply the second physical quantity to a second region different from the first region.

A tactile stimulation presentation method of one aspect of the present invention includes measuring, by a measurement unit, a first physical quantity with respect to a tactile sensation applied to a first region of a human body, converting, by a control unit, the first physical quantity into a second physical quantity of a different type from the first physical quantity, and applying, by a presentation unit, the second physical quantity to a second region different from the first region.

Effects of the Invention

According to the present invention, it is possible to provide a technology capable of improving perception sensitivity of tactile information when tactile stimulation is transmitted to a region separate from a region in contact with an object.

DESCRIPTION OF EMBODIMENTS

Hereinafter, an embodiment of the present invention will be described with reference to the drawings. The same reference numbers will be used throughout the drawings to refer to the same parts.

1. Outline of Present Invention

The present invention converts a first physical quantity with respect to a tactile sensation applied to a first region into a second physical quantity of a different type from the first physical quantity when the tactile stimulation is transmitted to a second region separate from a first region in contact with an object. It is possible to improve resolution of perception by converting tactile stimulation into a physical quantity of a different type and transmitting the physical quantity. For example, it is possible to convert a pressure measured with a fingertip into temperature stimulation and transmit the temperature stimulation to a palm so that a tactile difference can be discerned more finely.

2. Configuration of Tactile Stimulation Presentation Device

Figure 1:
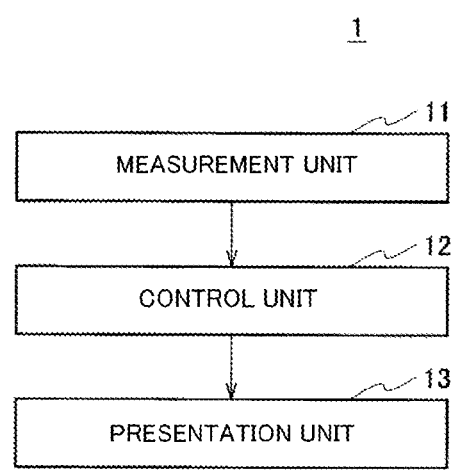
FIG. 1 is a diagram illustrating a configuration of a tactile stimulation presentation device.

FIG. 1 is a diagram illustrating a configuration of a tactile stimulation presentation device 1 according to the present embodiment. The tactile stimulation presentation device 1 includes a measurement unit 11, a control unit 12, and a presentation unit 13. The measurement unit 11 and the control unit 12 are physically connected through a cable. The control unit 12 and the presentation unit 13 are also physically connected through a cable.

The measurement unit 11 is provided on a first region of a human body and has a function of measuring a first physical quantity with respect to a tactile sensation applied to the first region. The measurement unit 11 is, for example, a pressure sensor that measures a pressure. The pressure sensor 11 is put on, for example, a fingertip of a human body, measures a pressure applied to the fingertip, and outputs a measured pressure value to the control unit 12. The measurement unit 11 may be a sensor other than the pressure sensor and may be a tactile sensor.

The control unit 12 has a function of converting the first physical quantity into a second physical quantity of a different type from the first physical quantity with respect to a tactile sensation. The control unit 12 is, for example, a microcomputer that converts a pressure into a temperature. The microcomputer 12 is, for example, a small terminal (e.g., Arduino or the like) that can be worn around a wrist or a device operating in a tablet terminal or a smartphone, converts a pressure value applied to a fingertip of a human body into a temperature depending on the magnitude of the pressure value, and provides the converted temperature to the presentation unit 13.

The presentation unit 13 is provided on a second region of the human body different from the first region and has a function of applying the second physical quantity to the second region. The presentation unit 13 is, for example, a Peltier element (thermoelectric element) that causes a metal surface to emit heat. The Peltier element 13 is put on a thenar eminence of the human body and applies heat corresponding to the temperature received from the microcomputer 12 to the thenar eminence. The presentation unit 13 may be an element other than the Peltier element and may be a tactile actuator.

3. Operation of Tactile Stimulation Presentation Device

Figure 2:
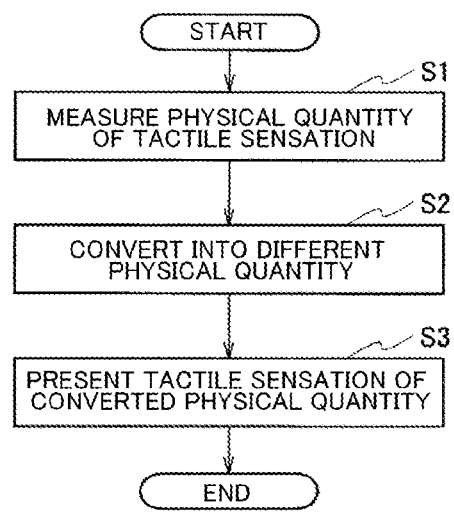
FIG. 2 is a diagram illustrating a processing flow of a tactile stimulation presentation method.
Figure 3:
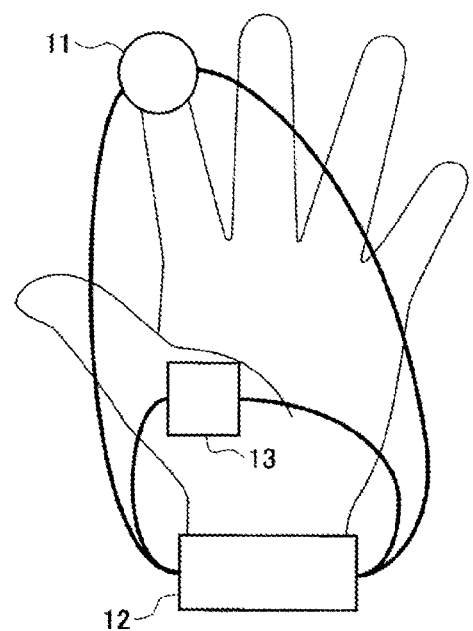
FIG. 3 is a diagram illustrating an example of a tactile stimulation presentation device.

FIG. 2 is a diagram illustrating a processing flow of a tactile stimulation presentation method performed by the tactile stimulation presentation device 1. The tactile stimulation presentation device 1 converts a measured tactile physical quantity into a different tactile physical quantity and then presents tactile stimulation. As illustrated in FIG. 3, the microcomputer 12 is worn around a wrist of a human body, the pressure sensor 11 is put on a fingertip, and the Peltier element 13 is put on a thenar eminence.

3.1. Operation Example 1

Step S1: First, the pressure sensor 11 measures a pressure applied to the fingertip of the human body and outputs a measured pressure value to the microcomputer 12.

Step S2: Next, the microcomputer 12 converts the pressure value output from the pressure sensor 11 into a current amount having a magnitude corresponding to the magnitude of the pressure value and applies a current of the converted current amount to the Peltier element 13.

Step S3: Finally, the Peltier element 13 causes a metal surface to emit heat at a temperature corresponding to the magnitude of the current amount applied by the microcomputer 12.

In operation example 1, heat at the temperature corresponding to the pressure applied to the fingertip can be presented to the thenar eminence because the pressure value of the pressure sensor 11 is converted into the current amount applied to the Peltier element 13, and perception sensitivity of tactile information can be improved because sensitivity to temperature stimulation is high in the thenar eminence.

3.2. Operation Example 2

In operation example 2, a tactile physical quantity conversion method is different from that of operation example 1.

Step S1: First, the pressure sensor 11 measures a pressure applied to a fingertip of a human body and outputs a measured pressure value to the microcomputer 12. The pressure sensor 11 is, for example, a sensor that detects a pressure applied to a diaphragm as deformation of the diaphragm, converts a detected analog value into a digital value, and outputs the converted digital value (e.g., a value in the range of 0 to 1023) as a pressure value.

Step S2: Next, the microcomputer 12 divides the pressure value (a value in the range of 0 to 1023) output from the pressure sensor 11 by 4 and sets the quotient as a pulse width modulation (PWM) control value (e.g., a value in the range of 0 to 255) of the Peltier element 13. To associate the pressure value with a value in the range of the PWM control value, the microcomputer 12 divides the pressure value by a ratio of an upper limit value of the pressure value to an upper limit value of the PWM control value, which is about 4.

Step S3: Finally, the Peltier element 13 causes the metal surface to emit heat at a temperature corresponding to the PWM control value on the basis of the PWM control value from the microcomputer 12.

In operation example 2, heat at the temperature corresponding to the pressure applied to the fingertip can be presented to the thenar eminence because the pressure value of the pressure sensor 11 is converted into the PWM control value applied to the Peltier element 13, and perception sensitivity of tactile information can be improved because sensitivity to temperature stimulation is high in the thenar eminence.

3.3. Operation Example 3

Operation example 3 is a modified example of operation examples 1 and 2.

The microcomputer 12 may calculate a difference between a pressure value from the pressure sensor 11 and a pressure value set in advance, present cold sensation stimulation to a thenar eminence by applying a low current to the Peltier element 13 when the calculated difference is negative, and present warm sensation stimulation by applying a high voltage to the Peltier element 13 when the difference is positive. When PWM control is used, cold sensation stimulation and warm sensation stimulation can also be presented. Switching between cold sensation stimulation and warm sensation stimulation can be realized, for example, by changing a current direction through a motor driver, and the strength of stimulation can be realized by changing a current value.

4. Application Example of Tactile Stimulation Presentation Device

4.1. Outline of Application Example

An aspect in which a human body uses a tactile stimulation presentation device 1 and a different tactile physical quantity corresponding to a tactile physical quantity measured in the human body is applied to the same human body has been described.

On the other hand, an aspect in which a plurality of human bodies H1, H2, . . . use the tactile stimulation presentation device 1 is also conceived. For example, a use form in which a tactile physical quantity measured in the human body H1 is transmitted to another human body H2 and a different tactile physical quantity corresponding to the transmitted tactile physical quantity is applied to the other human body H2 may be conceived. For example, a case in which tactile communication is performed in the same place, such as persons directly performing a handshake, may be conceived.

In addition, an aspect in which a tactile physical quantity measured in a human body H1 positioned in a place P1 is transmitted to another human body H2 positioned in another place P2 and a different tactile physical quantity corresponding to the transmitted tactile physical quantity is applied to the other human body H2 positioned in the other place P2 may be conceived. For example, a case in which tactile communication is performed between remote locations, such as performing indirect hand shaking between separate places, may be conceived.

4.2. Configuration of Application Example

In the case of these two aspects, the measurement unit 11 includes a communication circuit for performing wired or wireless communication or is connected to a communication device and has a function of transmitting a measured first physical quantity to another tactile stimulation presentation device 1'. For example, the pressure sensor 11 of the tactile stimulation presentation device 1 put on the human body H1 transmits a pressure value applied to a fingertip of the human body H1 to a control unit 12' of another tactile stimulation presentation device 1' put on the human body H2 through a communication network (e.g., an Internet line, a mobile line, a LAN, Wi-Fi, or Bluetooth).

The control unit 12 includes a communication circuit for performing wired or wireless communication or is connected to a communication device and has a function of receiving a first physical quantity transmitted from the measurement unit 11' of the other tactile stimulation presentation device 1' and converting the first physical quantity into a second physical quantity. For example, the microcomputer 12 of the tactile stimulation presentation device 1 put on the human body H1 receives a pressure value from the pressure sensor 11' of the other tactile stimulation presentation device 1' put on the human body H2 through an Internet line, converts the pressure value into a temperature, and applies the converted temperature to the presentation unit 13 of the tactile stimulation presentation device 1.

Further, the control unit 12 has a function of receiving the first physical quantity with respect to the human body H1 output from the measurement unit 11 and the first quantity with respect to the human body H2 transmitted from the other tactile stimulation presentation device 1' and adjusting the magnitude of the second physical quantity to be applied to the presentation unit 13 in response to the magnitude of a difference between the two first physical quantities. For example, the microcomputer 12 converts the first physical quantity with respect to the human body H2 received from the other tactile stimulation presentation device 1' into a temperature higher than an average temperature of hands when the difference is small and converts the difference into a temperature lower than the average temperature of the hands when the difference is large. Accordingly, a difference in the way of gripping between them can be transmitted through a temperature.

The presentation unit 13 has the same function as the above-described presentation unit 13. Specifically, the presentation unit 13 applies the second physical quantity converted by the control unit 12 (the second physical quantity converted from the first physical quantity with respect to the human body H2 received from the other tactile stimulation presentation device 1' or the second physical quantity adjusted by the control unit 12 in the present application example) to the second region of the human body H1.

4.3. Operation of Application Example

A case in which tactile communication is performed between separate places will be described. When tactile communication is performed between separate places, a model of a hand is installed in both of the remote locations and a glove having the pressure sensor 11, the microcomputer 12, and the Peltier element 13 is used. The pressure sensor 11 may be attached to the side of the model of the hand.

When users (human bodies H1 and H2) positioned in two places P1 and P2 that are remote locations wear the glove and shake hands with the model of the hand, the pressure sensor 11 of the tactile stimulation presentation device 1 put on the human body H1 outputs a pressure value applied to a fingertip of the human body H1 to the microcomputer 2 of the tactile stimulation presentation device 1. At the same time, the pressure sensor 11' of the other tactile stimulation presentation device 1' put on the human body H2 transmits a pressure value applied to a fingertip of the human body H2 to the microcomputer 2 of the tactile stimulation presentation device 1 through an Internet line.

Next, the microcomputer 2 of the tactile stimulation presentation device 1 compares the pressure value with respect to the human body H1 with the pressure value with respect to the human body H2, applies a high current to the Peltier element 13 when the pressure values are close to each other and applies a low current to the Peltier element 13 when the pressure values greatly differ from each other.

Thereafter, the Peltier element 13 of the tactile stimulation presentation device 1 generates heat at a high temperature when the high current is applied. Accordingly, a pleasant temperature can be presented to the human body H1. On the other hand, the Peltier element 13 generates heat at a low temperature when the low current is applied. Accordingly, an unpleasant temperature can be presented to the human body H1.

In the application example, a user can present heat at a temperature in response to a gripping force of a hand of a handshaking counterpart to a thenar eminence of the user and a difference between gripping sides can be transmitted through a temperature.

5. Effects

According to the present embodiment, the tactile stimulation presentation device 1 includes the measurement unit 11 configured to measure a first physical quantity with respect to a tactile sensation applied to a first region of a human body, the control unit 12 configured to convert the first physical quantity into a second physical quantity of a different type from the first physical quantity, and the presentation unit 13 configured to apply the second physical quantity to a second region different from the first region. Accordingly, it is possible to provide a technology capable of improving perception sensitivity of tactile information when tactile stimulation is transmitted to a region separate from a region in contact with an object.

6. Other

The present invention is not limited to the above-described embodiment and various modifications can be made without departing from the essential characteristics of the present invention.

Figure 4:
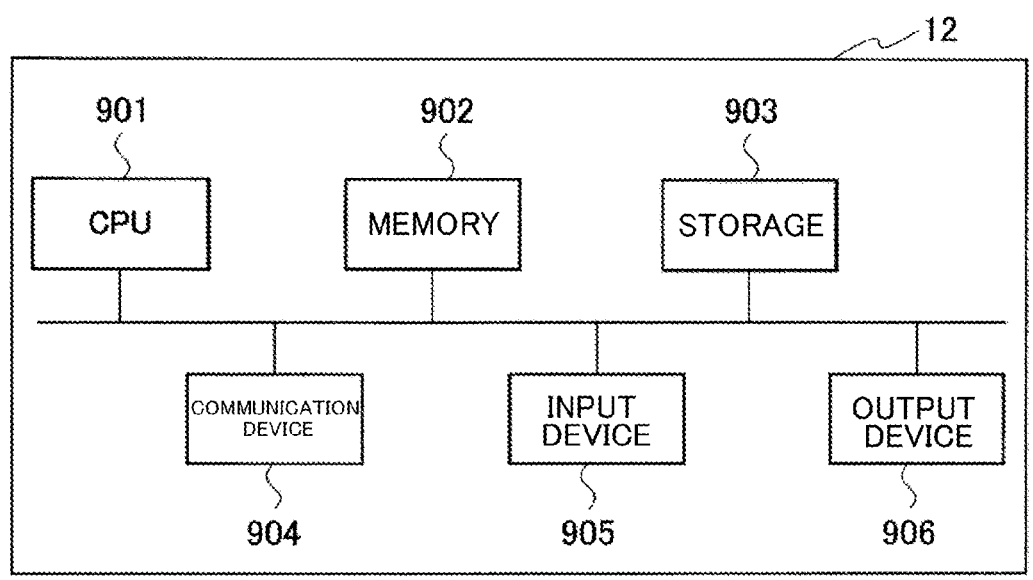
FIG. 4 is a diagram illustrating a hardware configuration of a control unit.

For example, a general-purpose computer system including a central processing unit (CPU) 901, a memory 902, a storage 903 (a hard disk drive or a solid state drive), a communication device 904, an input device 905, and an output device 906, as illustrated in FIG. 4, can be used as the control unit 12 of the above-described present embodiment. The memory 902 and the storage 903 are storage devices. In this computer system, each function of the control unit 12 is realized by the CPU 901 executing a predetermined program loaded on the memory 902.

Further, the control unit 12 may be implemented as a single computer or a plurality of computers. In addition, the control unit 12 may be a virtual machine implemented as a computer. A program for the control unit 12 can be stored in a computer-readable recording medium such as an HDD, an SSD, a Universal Serial Bus (USB) memory, a compact disc (CD), or a digital versatile disc (DVD), or distributed through a network.

REFERENCE SIGNS LIST

1 Tactile stimulation presentation device
11 Measurement unit
12 Control unit
13 Presentation unit
901 CPU
902 Memory
903 Storage
904 Communication device
905 Input device
906 Output device

The invention claimed is:

1. A tactile stimulation presentation device comprising:
a measurement unit, including one or more processors, configured to measure a first measurement of a first type of physical quantity with respect to a tactile sensation applied to a first region of a first human body;
a control unit, including one or more processors, configured to receive a second measurement of the first type of physical quantity applied to a second human body that is different from the first human body, determine a difference between the first measurement of the first type of physical quantity applied to the first human body and the second measurement of the first type of physical quantity applied to the second human body, convert the second measurement of the first type of physical quantity into a second physical quantity of a different type from the first type of physical quantity, and adjust a magnitude of the second physical quantity based on the difference between the first measurement and the second measurement of the first type of physical quantity; and
a presentation unit, including one or more processors, configured to apply the second physical quantity to a second region of the first human body.

2. The tactile stimulation presentation device according to claim 1, wherein
the measurement unit is configured to transmit the first measurement of the first type of physical quantity with respect to the first human body to another tactile stimulation presentation device.

3. A tactile stimulation presentation method comprising:
measuring, by a measurement unit, a first measurement of a first type of physical quantity with respect to a tactile sensation applied to a first region of a first human body;
receiving, by a control unit, a second measurement of the first type of physical quantity applied to a second human body that is different from the first human body;
determining, by the control unit, a difference between the first measurement of the first type of physical quantity applied to the first human body and the second measurement of the first type of physical quantity applied to the second human body;
converting, by the control unit, the second measurement of the first type of physical quantity into a second physical quantity of a different type from the first type of physical quantity;
adjusting a magnitude of the second physical quantity based on the difference between the first measurement and the second measurement of the first type of physical quantity; and
applying, by a presentation unit, the second physical quantity to a second region of the first human body.

4. The tactile stimulation presentation method according to claim 3, further comprising:
transmitting, by the measurement unit, the first measurement of the first type of physical quantity with respect to the first human body to another tactile stimulation presentation device.

* * * * *